US010523435B2

(12) United States Patent
Pilcher (10) Patent No.: US 10,523,435 B2
(45) Date of Patent: Dec. 31, 2019

(54) MUTABLE FIELDS IN DIGITAL CERTIFICATES

(71) Applicant: DigiCert, Inc., Lehi, UT (US)

(72) Inventor: Jared Pilcher, Lehi, UT (US)

(73) Assignee: DigiCert, Inc., Lehi, UT (US)

( * ) Notice: Subject to any disclaimer, the term of this patent is extended or adjusted under 35 U.S.C. 154(b) by 626 days.

(21) Appl. No.: 15/200,682

(22) Filed: Jul. 1, 2016

(65) Prior Publication Data

US 2017/0026177 A1 Jan. 26, 2017

Related U.S. Application Data

(60) Provisional application No. 62/194,335, filed on Jul. 20, 2015.

(51) Int. Cl.
*H04L 9/08* (2006.01)
*H04L 9/32* (2006.01)

(52) U.S. Cl.
CPC .......... *H04L 9/0891* (2013.01); *H04L 9/0819* (2013.01); *H04L 9/0861* (2013.01); *H04L 9/3247* (2013.01); *H04L 9/3268* (2013.01)

(58) Field of Classification Search
CPC ... H04L 9/0891; H04L 9/0819; H04L 9/0861; H04L 9/3247; H04L 9/3268; H04L 9/3263; H04L 9/3265
See application file for complete search history.

(56) References Cited

U.S. PATENT DOCUMENTS

| 2002/0026582 A1* | 2/2002 | Futamura | H04L 9/3268 713/170 |
| 2008/0104401 A1* | 5/2008 | Miyamoto | H04L 9/3247 713/175 |
| 2011/0314271 A1* | 12/2011 | Boccon-Gibod | G06F 21/6218 713/151 |
| 2015/0188779 A1* | 7/2015 | McCanne | H04L 63/10 709/203 |
| 2015/0312041 A1* | 10/2015 | Choi | H04L 9/3231 713/175 |

* cited by examiner

*Primary Examiner* — Linglan E Edwards
*Assistant Examiner* — Forrest L Carey
(74) *Attorney, Agent, or Firm* — Knobbe, Martens, Olson & Bear, LLP (57) ABSTRACT

By implementing a mutable certificates approach, a server to which a digital certificate has been issued may update one or more certificate fields without the need for a new certificate or other intervention from the issuing certificate authority. A certificate authority uses extensions to identify fields that a server may update, and to identify a set or range of allowable values for those fields. A server may use the extensions to identify one or more fields to be updated, and the values to which those fields should be updated. The server may sign those field values with its private key. A client, upon receiving a digital certificate from a server with fields for updating, validates the field values using the server's public key, and then proceeds to update the certificate field values.

23 Claims, 5 Drawing Sheets

FIG. 1

120 Extensions

130 Mutable Fields

132a Field: Validity:Not Before
132b Allowable Values: 12/1/2014-1/1/2016

134a Field: Validity:Not After
134b Allowable Values: 1/1/2016-3/1/2016

136a Field: Subject:OU
136b Allowable Values: "Big Co. Utah, Inc."; "Big Co. Colorado, Inc."; Big Co. Nevada, Inc."; "Big. Co. Idaho, Inc."

138a Field: Subject Public Key Info:Modulus
138b Allowable Values: no constraints

140 Mutable Field Values

142a Field: Validity:Not After
142b Value: 2/1/2016

144a Field: Subject:OU
144b Value: "Big Co. Colorado, Inc."

146a Field: Subject Public Key Info:Modulus
146b Value: 00:b4 . . . 41:8f

150 Mutable Signature Value

MUTABLE FIELDS IN DIGITAL CERTIFICATES

BACKGROUND OF THE INVENTION

Digital Certificates ("certificates") are critical to Internet security. Certificates are electronic files that make it possible for information to be transferred privately over the Internet. Such information may include personal identifying information, individually identifiable health information, proprietary information, and confidential information. Certificates provide peace of mind to Internet users by verifying the identity of the destination to which a user is sending sensitive or confidential information. Digital Certificates also may be used in a wide variety of other computer transactions to verify identities, ensure privacy, and otherwise secure the transaction.

Certificates are issued by Certificate Authorities ("CA"s), or by trusted intermediaries of CAs. As used herein, "CA" may also include an intermediary of a CA. An intermediary CA of a root CA is trusted and operated by the root CA, and issues certificates on behalf of the root CA. A CA issues a certificate, encrypted with the CA's private key, to a requesting website operator after the CA has taken measures to verify the identity of the website operator. The issued certificate includes the website's public key. The website is the only entity that knows the private key associated with the website's public key.

When an Internet user visits the website, the website presents its certificates to the user to verify its identity to the visiting Internet user. When presented with a certificate, an Internet user, generally through a browser such as Internet Explorer, Chrome, or Firefox, consults its list of trusted CAs. If this list of trusted CAs includes the CA that allegedly issued the certificate (i.e., the CA identified in the certificate as the alleged issuer of the certificate), then the Internet user will verify the authenticity of the certificate by (1) using the CA's public key to decrypt the hash included with the certificate (which is the hashed certificate data encrypted with the CA's private key), (2) generating a hash from the data in the certificate, and (3) confirming that the hashes resulting from the first two steps are the same. If these two hashes match, then the Internet user will generally conclude both (1) that the certificate was actually issued by the issuer identified in the certificate, and (2) that the website (or other resource) is operated by the entity identified in the certificate.

Now the Internet user and the website operator agree on a symmetric key to user for a particular communication session. The Internet user reads the website operator's public key, which is included as a field in the website's certificate. The Internet user generates a symmetric key, uses the website's public key to encrypt the symmetric key, and sends the encrypted symmetric key to the website. The website uses its private key to decrypt the encrypted symmetric key received from the Internet user. At this point, the Internet user and website have completed a "handshake," and both know an otherwise secret symmetric key. The Internet user and website use this symmetric key for encrypting and decrypting communications with each other.

One shortcoming in this public key infrastructure is that the operator of a website or other network server or Internet server is fully dependent on the CA for all modifications to a certificate, even modifications that are trivial and/or secure. For example, for a website to edit or update its subject name in its certificate requires the website to obtain a new or modified certificate from a CA. It would be beneficial and more efficient if a website, Internet server, or other network server could update at least a subset of certificate fields without CA intervention.

Another significant concern with the public key infrastructure network security vulnerabilities resulting in the compromise of a website's private key(s). The Heartbleed attack highlighted this vulnerability. The Heartbleed virus exploited a vulnerability in the public key infrastructure (sometimes referred to loosely as "SSL") to scan the memory contents of network servers, such as webservers, to find and compromise private keys. These compromised private keys could then be used to masquerade as the owner of the domain or for other nefarious activities. Because the private keys secured the certificates used by websites, webservers, and other servers, the administrators of these servers had to revoke their certificates, and then reinstall their certificates, resulting in many lost operational hours for their servers.

Some users of digital certificates have sought to mitigate potential damage from Heartbleed or similar breaches by frequently reinstalling new certificates (called Short-Term Certificates). Such an approach may reduce the risk of serious server damage and data loss if a private key is lost. The short-term-certificates scheme assumes, however, that fields are unmodifiable because of the certificate's signature.

What is needed is an approach, system, and/or method whereby (1) a website, Internet server, or other network server may modify some or all certificate fields without CA intervention and (2) a primary private key is not stored in the memory of a host computer or server.

BRIEF SUMMARY OF THE INVENTION

The invention disclosed herein provides a system and method whereby a website server, Internet server, or other network server (generally referenced herein as a "server") may modify one or more fields in a digital certificate without intervention from a certificate authority ("CA").

In one embodiment, the digital certificate is an X.509 certificate that supports extensions. These extensions allow for custom fields in addition to standard X.509 fields. Both the certificate authority that issues the digital certificate, as well as the server to which the digital certificate is issued, may use the extensions to store information for updating digital certificate fields, and also for validating those updates. The disclosure herein refers to fields that are modifiable under this invention as "mutable fields," and refers to certificates implementing this invention as "mutable certificates," or "mutable-certificate-compliant digital certificates."

In one embodiment, a certificate authority may include three extensions in a digital certificate: mutable fields, mutable field values, and mutable signature value. The mutable fields extension may identify fields that the certificate authority permits the digital certificate subject to modify. The digital certificate subject is the entity to which the digital certificate is issued, e.g., a server or webserver. The mutable fields extension may also identify constraints on permissible values for a particular X.509 field, e.g., a range of allowable values.

The mutable field values extension identifies the values to which particular X.509 fields should be modified. The server, i.e., the digital certificate subject, sets the values in the mutable field values extension.

The mutable signature value extension is a hash of the mutable field values extension, signed with the server's private key.

In one preferred embodiment, a certificate authority receives a request from a server for a digital certificate that complies with the mutable certificates protocol disclosed herein. The certificate authority includes three extensions: mutable fields, mutable field values, and mutable signature value. In the mutable fields extension, the certificate authority identifies mutable fields and allowable values for those mutable fields. The certificate authority leaves the mutable field values and mutable signature values extensions empty, and signs the digital certificate with its private key as in a conventional digital certificate scheme. The certificate authority provides the mutable-certificate-compliant digital certificate to the server.

When the server receives a resource request from a client, e.g., a web browser client requesting a web page from the server, the server may determine to use the X.509 extensions to direct the requesting web browser to modify some of the fields in the digital certificate. The server identifies fields to me modified, as well as the new values for these fields, in the mutable field values extension, generates a signature by hashing the these new field values and signing the hash result with its private key, and places this signature in the mutable signature value extension.

When a client, e.g., a web browser, receives a mutable-certificates-enabled digital certificate from a server, it removes the mutable field values and mutable signature value extensions to verify the certificate authority's signature as in a conventional digital signature system, and then uses the server's public key to verify the mutable signature value, thereby verifying that the new values in the mutable field values extension are actually from the webserver. Applying the invention in this manner, a server to whom a mutable-certificate-compliant digital certificate has been issued is able to update one or more field values without the need to obtain a new certificate from a certificate authority, and without the need for any intervention at all from the certificate authority.

DETAILED DESCRIPTION OF THE INVENTION

This application claims priority to U.S. Provisional Application No. 62/194,335 (Pilcher: METHOD AND SYSTEM FOR MUTABLE CERTIFICATES TO PROTECT PRIVATE KEYS), filed Jul. 20, 2015.

The invention disclosed herein provides a system and method whereby a website server, Internet server, or other network server (generally referenced herein as a "server") may modify one or more fields in a digital certificate without intervention from a certificate authority ("CA").

Although the disclosure herein generally references the format, structure, and fields of an X.509 digital certificate, the invention disclosed herein could be analogously applied to similar schemes, systems, or protocols for digital certificates or other security systems.

Applying the invention disclosed herein, a server and Internet user may utilize the X.509 extensions field to update field values in a digital certificate without intervention from the CA that issued the certificate. The X.509 extensions field is a field that allows for customized fields and values to be added to an X.509 certificate.

Although the examples referenced below are based on a web/Internet browser communicating with a website's webserver, this invention is not limited to the context of a web/Internet browser and webserver. This invention applies analogously, with minor adaptations well within the knowledge and skill of a person of ordinary skill in the art, to any context in which computer entities communicate, or are intended to communicate, in a secure manner using a public key infrastructure or analogous encryption or security infrastructure. The discussion below will generally refer to a "webserver" as a server or other device that obtains a digital certificate from a certificate authority and provides the digital certificate to other parties for authentication and security. A "browser," as used herein below, generally refers to an Internet browser or other device that communicates with one or more servers, e.g., a webserver, over the Internet, or other network.

Figure 3:
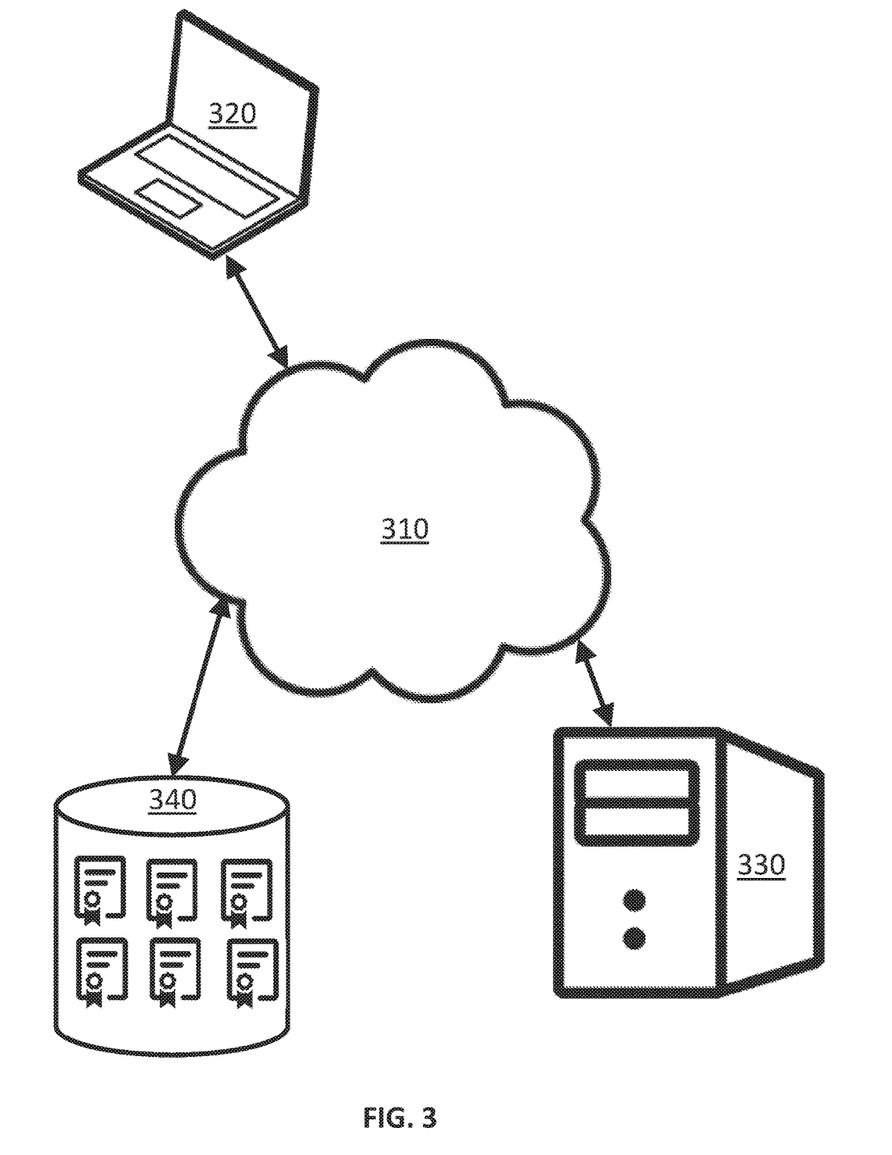
FIG. 3 shows one embodiment of communication for a client, webserver, and certificate authority.

FIG. 3 shows the basic communications structure of a CA, webserver, and browser. Browser 320, webserver 330, and CA 340 communicate with each other over a network 310 such as the Internet or other computer network. Browser 320, webserver 330, and CA 340 could be any configuration of hardware, software, or combination of hardware and software configured to communicate over a network and perform the functions a browser, webserver, or CA, respectively.

Figure 1:
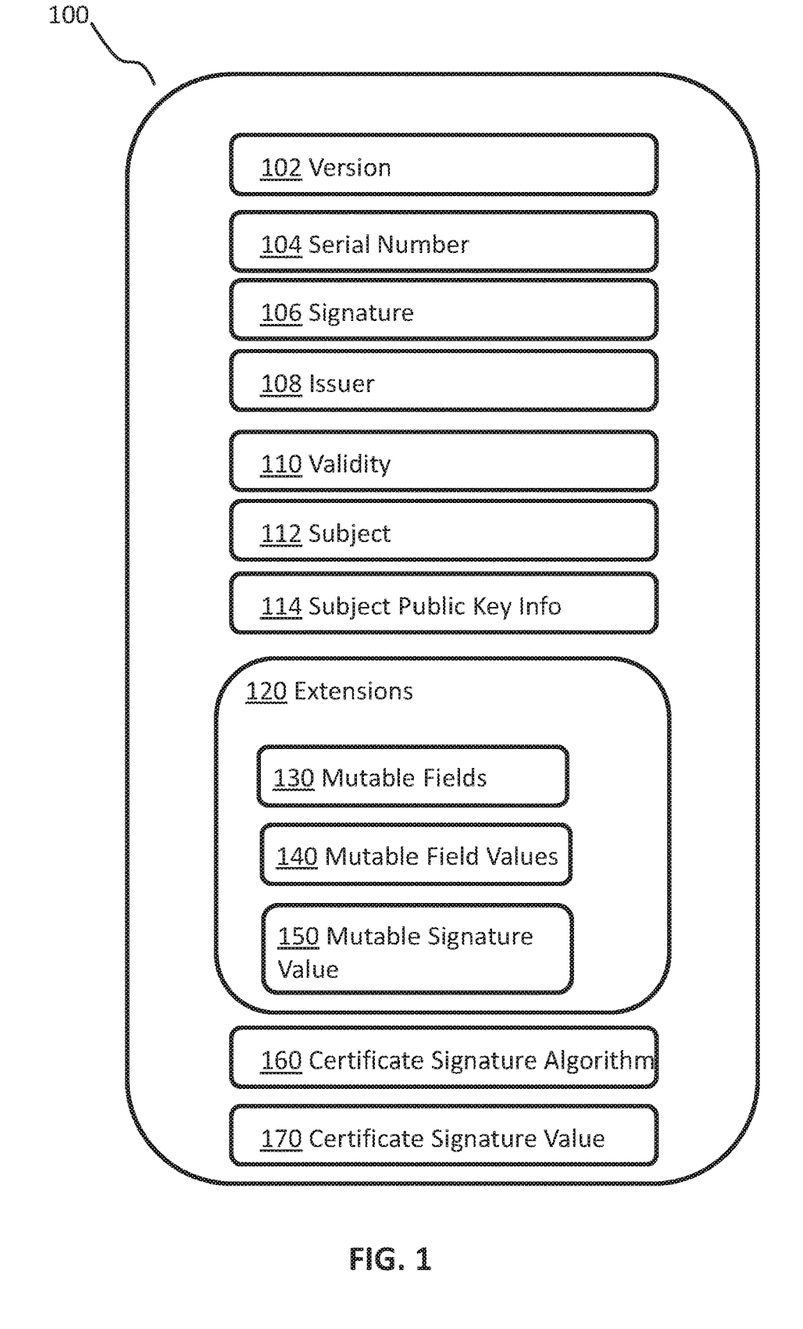
FIG. 1 shows an exemplary digital certificate configured to implement the mutable fields invention described herein.

FIG. 1 illustrates the structure of an exemplary X.509 digital certificate 100. Certificate 100 does not necessarily show all fields and/or elements of an X.509 digital certificate, whether mandatory or discretionary, but is instead intended to illustrate the certificate features applicable to the invention described herein.

Certificate 100 shows X.509 fields Version 102, Serial Number 104, Signature 106, Issuer 108, Validity 110, Subject 112, Subject Public Key Info 114, Extensions 120, Certificate Signature Algorithm 160, and Certificate Signature Value 170.

Version 102 identifies the version of X.509.

Serial Number 104 is a unique identifier for a certificate for a particular CA.

Issuer 108 identifies the CA that issued the certificate.

Validity 110 identifies a begin date and end date between which the certificate is valid.

Subject 112 identifies the entity (i.e., the "subject") (e.g., website, Internet server, network server) to which the certificate was issued, and whose identity the certificate is designed to verify.

Subject Public Key Info 114 identifies the encryption algorithm used for the subject's public and private key, and also identifies the subject's public key.

Extensions 120 allows for inclusion of additional fields and information, including custom, i.e., non-standard, fields in a certificate.

Certificate Signature Algorithm 160 identifies the algorithm, or hash, that the CA used to sign the certificate.

Certificate Signature Value 170 is the digital signature by which the issuing CA signs the certificate. The CA generates this field by applying the algorithm or hash identified in Certificate Signature Algorithm 160 to the contents of the certificate (other than Certificate Signature Value 170 and extensions Mutable Field Values 140 and Mutable Signature Values 150) and encrypting the result with the CA's private key.

Figure 4:
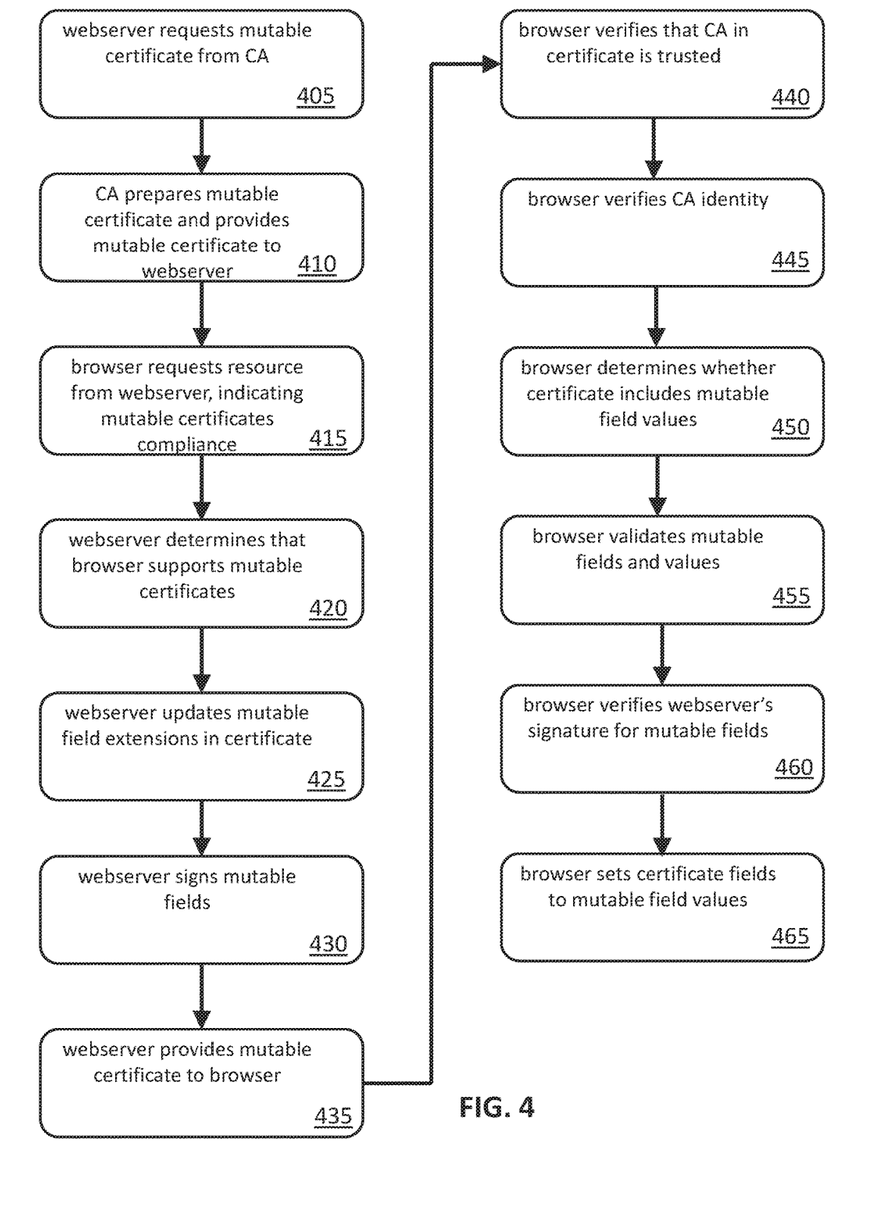
FIG. 4 is a flow chart illustrating the steps of one embodiment of the invention disclosed herein.

FIG. 4 is a flowchart showing the steps and process of one embodiment of the invention disclosed herein. The flowchart is exemplary of one embodiment and is not intended to indicate a mandatory ordering of steps, or to indicate that all steps are mandatory.

Referring to FIG. 4, at step 405 webserver 330 may request a mutable certificate from CA 340. At step 410, the CA may prepare a mutable certificate, e.g., mutable certificate 100 as shown in FIG. 1. When the CA prepares mutable certificate 100, the CA identifies, in Mutable Fields extension 130, the certificate fields that webserver 330 may (i.e., is permitted to) modify through the use of Mutable Field Values extension 140 and Mutable Signature Value extension 150, according to this invention as disclosed herein. In addition to identifying the fields that a webserver is permitted to modify, the CA also indicates, in Mutable Fields extension 130, the allowable values, or range(s) of values, for each particular modifiable field. Mutable Fields extension 130 in FIG. 2 indicates that webserver 330 is permitted to modify fields 132*a*, 134*a*, 136*a*, and 138*a* to the "Allowable Values" 132*b*, 134*b*, 136*b*, and 138*b*, respectively.

At step 415, a browser 320 contacts webserver 330 to request a document such as a webpage. In one embodiment, browser 320 may indicate in its request that it implements the mutable certificates protocol.

At step 420, webserver 330 determines that browser 320 supports and implements the mutable certificates protocol.

Figure 2:
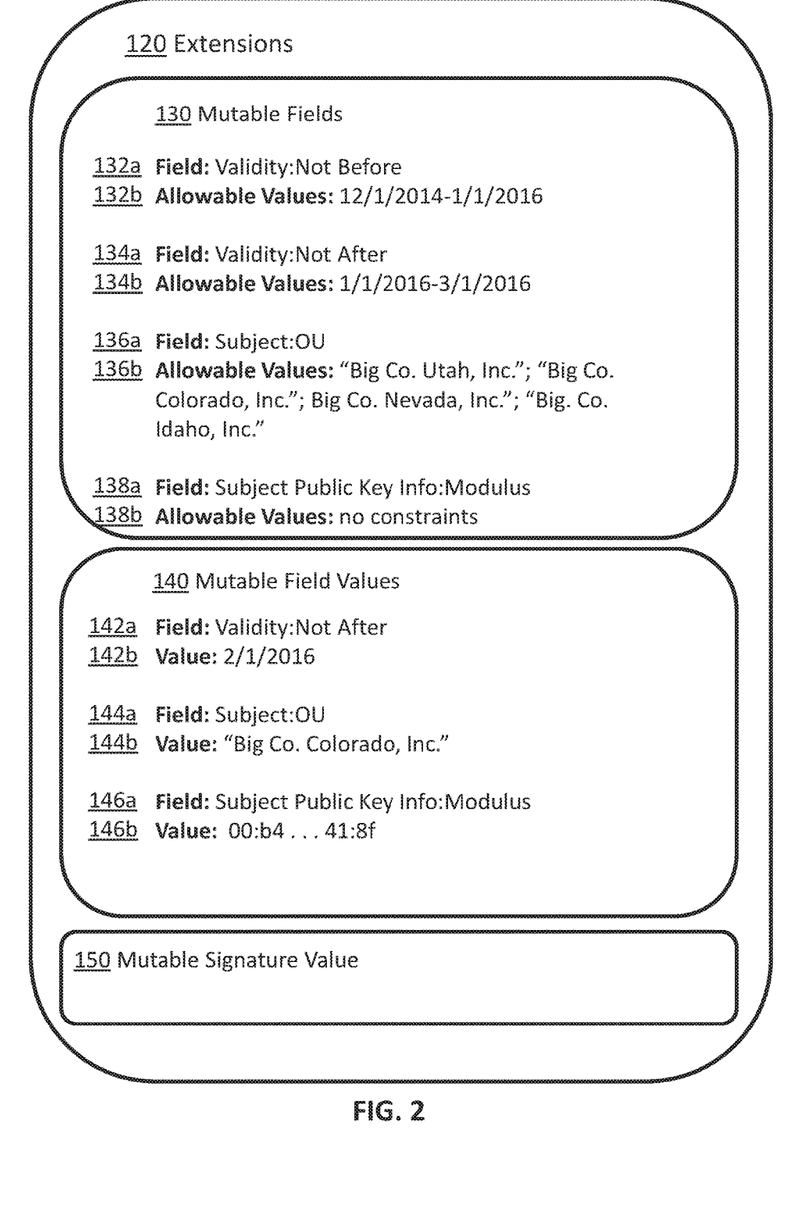
FIG. 2 shows an exemplary set of extensions from a digital certificate.

Having determined that browser 320 supports the mutable certificates protocol, at step 425 webserver 330 may update Mutable Field Values extension 140 to indicate certificate fields to modify and values to which those fields should be set. For example, as shown in FIG. 2, webserver 330 may update Mutable Field Values extension 140 to indicate that field 142*a* ("Validity:Not After) should be set to value 142*b* ("2/1/2016"), field 144*a* ("Subject:OU") should be set to value 144*b* ("Big Co. Colorado, Inc."), and field 146*a* ("Subject Public Key Info: Modulus") should be set to value 146*b* ("00:b4 . . . 41:8f").

At step 430, webserver 330 may sign Mutable Field Values extension 140 by hashing the content of Mutable Field Values extension 140 with the hash algorithm identified in Certificate Signature Algorithm 160 and encrypting the hash with webserver 330's private key, i.e., the private key associated with its public key disclosed in certificate 100 in field 114 ("Subject Public Key Info").

At step 435, to establish a secure and private connection, and additionally for the purpose of proving its identity, webserver 330 responds to the request of browser 320 by providing mutable certificate 100. In one embodiment, and as referenced in the discussion herein of an exemplary embodiment, mutable certificate 100 may be an X.509 certificate.

At step 440, browser 320 may verify that the CA identified in field 108 ("Issuer") of certificate 100 is a CA that browser 320 trusts. To do this, browser 320 may first extract the value of the Issuer field 108 to determine the CA 340 that allegedly issued certificate 100. At this point in the handshake, browser 320 has not verified the identity of the issuer of the certificate, and knows only the alleged identity from the field Issuer 108. The browser checks its list of trusted CAs to determine if the alleged issuing CA in the field Issuer 108 is a trusted CA.

At step 445, upon determining that it trusts the alleged issuing CA in the field Issuer 108, the browser may proceed to verify the identity of the issuing CA. The browser does this by applying the algorithm identified in the field Certificate Signature Algorithm 160, which is generally a hash algorithm, to the contents of the certificate other than for Certificate Signature Value 170 and the extensions Mutable Field Values 140 and Mutable Signature Value 150. The browser then uses the alleged issuing CA's public key to decrypt the value in the field Certificate Signature Value 170. If these two values, i.e., the result of applying Certificate Signature Algorithm 160 to the certificate contents and the result of decrypting Certificate Signature Value 150 with the alleged issuing CA's public key, match, then browser 320 concludes that Certificate Signature Value 170 must be a hash of the contents of certificate 100, encrypted with the alleged issuing CA's private key, and that the CA identified in Issuer 108 is the CA that actually issued certificate 100 and signed certificate 100 with Certificate Signature Value 170.

At step 450, having verified the identity of issuing CA 340, a compliant browser, i.e., a browser that implements the mutable certificates protocol disclosed herein, may then determine whether the webserver has included any mutable fields values with certificate 100.

As a note, not all browsers will be compliant with, i.e., implement, the mutable certificates protocol disclosed and described herein. A non-compliant browser does not cause this invention to fail, or preclude useful communication between the browser and webserver. This invention is backwards compatible. A non-compliant browser may simply ignore the extensions Mutable Fields 130, Mutable Field Values 140, and Mutable Signature Value 150. In a preferred embodiment, issuing CA 340 leaves the extensions Mutable Field Values 140 and Mutable Signature Value 150 empty.

In one embodiment of this invention, webserver 330 may leave the Mutable field values 140 and Mutable Signature Value 150 extensions empty for non-compliant browsers. A non-compliant browser will therefore be able to successfully authenticate the identity of the issuing CA, which also left these two extensions empty and therefore also did not use them in its computation of Certificate Signature Value 170.

Continuing with step 450, compliant browser 320 checks for Mutable Fields extension 130, Mutable Field Values extension 140, and Mutable Signature Value 150. Mutable Fields 130 may comprise a set of fields and allowable values for such fields. FIG. 2 illustrates an exemplary Mutable Fields extension 130.

For example, as shown in FIG. 2, which illustrates an exemplary set of extensions 120 for certificate 100, Mutable Fields extension 130 may identify several fields 132*a*, 134*a*, 136*a*, and 138*a* and respective allowable values 132*b*, 134*b*, 136*b*, and 138*b* for such fields. For example, Mutable Fields extension 130 may identify mutable field "Validity:Not Before" 132*a* and indicate allowable values 132*b* as the date range "12/1/2014-1/1/2016." Mutable Fields extension 130 may identify mutable field "Validity:Not After" 134*a* and indicate allowable values 134*b* as the date range "1/1/2016-3/1/2015." Mutable Fields extension 130 may identify mutable field "Subject:OU" 136*a* and indicate allowable values 136*b* as any value from the set {"Big Co. Utah, Inc."; "Big Co. Colorado, Inc."; Big Co. Nevada, Inc."; "Big. Co. Idaho, Inc."}. Mutable Fields extension 130 may identify mutable field "Subject Public Key Info:Modulus" 146*a* and indicate "no constraints," i.e., that any value is allowable. Many different structures and/or encodings, and variations of such, may be used to implement storage of the information in Mutable Fields extension 130.

Mutable Field Values extension 140 may identify several fields 142*a*, 144*a*, and 146*a* and modified values 142*b*, 144*b*, and 146*b* for those fields. Mutable Field Values extension 140 may identify mutable field "Validity: Not After" 142*a* and indicate that the value for this field in certificate 100 should be set to "2/1/2016" as shown by value 142*b*. Mutable Field Values extension 140 may identify mutable field "Subject: OC" 144*a* and indicate that the value for this field in certificate 100 should be set to "Big Co. Colorado, Inc." as shown by value 144*b*. Mutable Field Values extension 140 may identify mutable field "Subject Public Key Info:Modulus" 146*a* and indicate that the value for this field in certificate 100 should be set to "00:b4... 41:8f" as shown by value 146*b*.

At step 455, upon determining that certificate 100 includes extensions Mutable Fields 130, Mutable Field Values 140, and Mutable Signature Value 150, browser 320 validates Mutable Field Values extension 140 to ensure that the fields for which new values are provided in Mutable Field Values extension 140 are identified as modifiable fields in Mutable Fields extension 130, that the new field values provided in Mutable Field Values 140 comply with the "Allowable Value" constraints in Mutable Fields extension 130, and that it was the webserver that set the new fields values in Mutable Field Values extension 140.

The Mutable Signature Value extension 150 may be, in one embodiment, the result of applying the hash function identified in Certificate Signature Algorithm 160 to the Mutable Field Values extension 140, and then encrypting the resulting hash with webserver 330's private key.

For example, referring to FIG. 2, the browser may verify that fields 142*a*, 144*a*, and 146*a*, i.e., "Validity:Not After," "Subject: OC," and "Subject Public Key Info:Modulus" are identified in Mutable Fields extension 130 as modifiable fields. As shown in FIG. 2, because fields 142*a*, 144*a*, and 146*a* are identified as modifiable fields 134*a*, 136*a*, and 138*a*, respectively, the browser may determine that the fields 142*a*, 144*a*, and 146*a* are modifiable. The browser may then verify that the values 142*b*, 144*b*, and 146*b* comply with the "Allowable Values" 134*b*, 136*b*, and 138*b*. As shown in FIG. 2, the browser may confirm that value 142*b*, "2/1/2016" for the field "Validity:NotAfter" is within the range 134*b*, i.e., "1/1/2016-3/1/2015." Browser 320 may perform a similar check for each of the values 142*b*, 144*b*, and 146*b* in Mutable Field Values extension 140.

At step 460, browser 320 may also verify that the fields and associated values in Mutable Field Values 140 are from webserver 330. To do this, browser 320 may apply a hash (identified in Certificate Signature Algorithm 160) algorithm to Mutable Field Values extension 140 and compare the result with the decrypted (using the public key of web server 330) Mutable Signature Value extension 150. If these values match, browser 320 is confident that webserver 330, and not another entity, modified the fields and values in Mutable Field Values extension 140.

Upon finding any problems with the Mutable Field Values extension 140, e.g., that the fields in Mutable Field Values 140 are not modifiable, or that the new values for the fields in Mutable Field Values 140 are not within the "Allowable Values" constraints in Mutable Fields extension 130, or that the decrypted Mutable Signature Value extension 150 does not match the hashed Mutable Field Values extension 140, then browser 320 may respond by aborting the request to webserver 330, or may alternatively respond by continuing the request but ignoring the Mutable Field, Mutable Field Values, and Mutable Signature Value. Browser 320 may alternatively respond with any other variety of responses that are well-known in the art.

In general, steps 445, 450, 455, and 460 may be performed in any order. The order described herein is merely exemplary.

At step 465, upon determining that the fields in Mutable Field Values extension 140 are modifiable, and that the associated new field values comply with the "Allowable Values" constraints, and that the new field values in Mutable Field Values extension 140 are actually from the webserver, browser 320 may update the field values in certificate 100 with the values in Mutable Field Value extension 140 and continue with the processing of certificate 100 and communication with webserver 100.

This approach has several benefits. First, it allows a webserver to update certificate fields without intervention from a CA. For example, instead of obtaining a new or updated certificate from a CA when the certificate has expired, a CA may indicate, in Mutable Fields extension 130, that the "Validity:NotAfter" field may be extended, and a webserver may extend the "Validity:NotAfter" date by providing a new value in the Mutable Field Values extension. The "Subject:0U" field, which is the "organizational unit" name provided in a certificate to identify the subject of the certificate, could be modified depending on, e.g., the physical location of the browser requesting a webpage from a webserver. For example, as shown in FIG. 2, a webserver could provide different company names 136*b* depending on whether the browser is in Utah, Colorado, Nevada, or Idaho.

Figure 5:
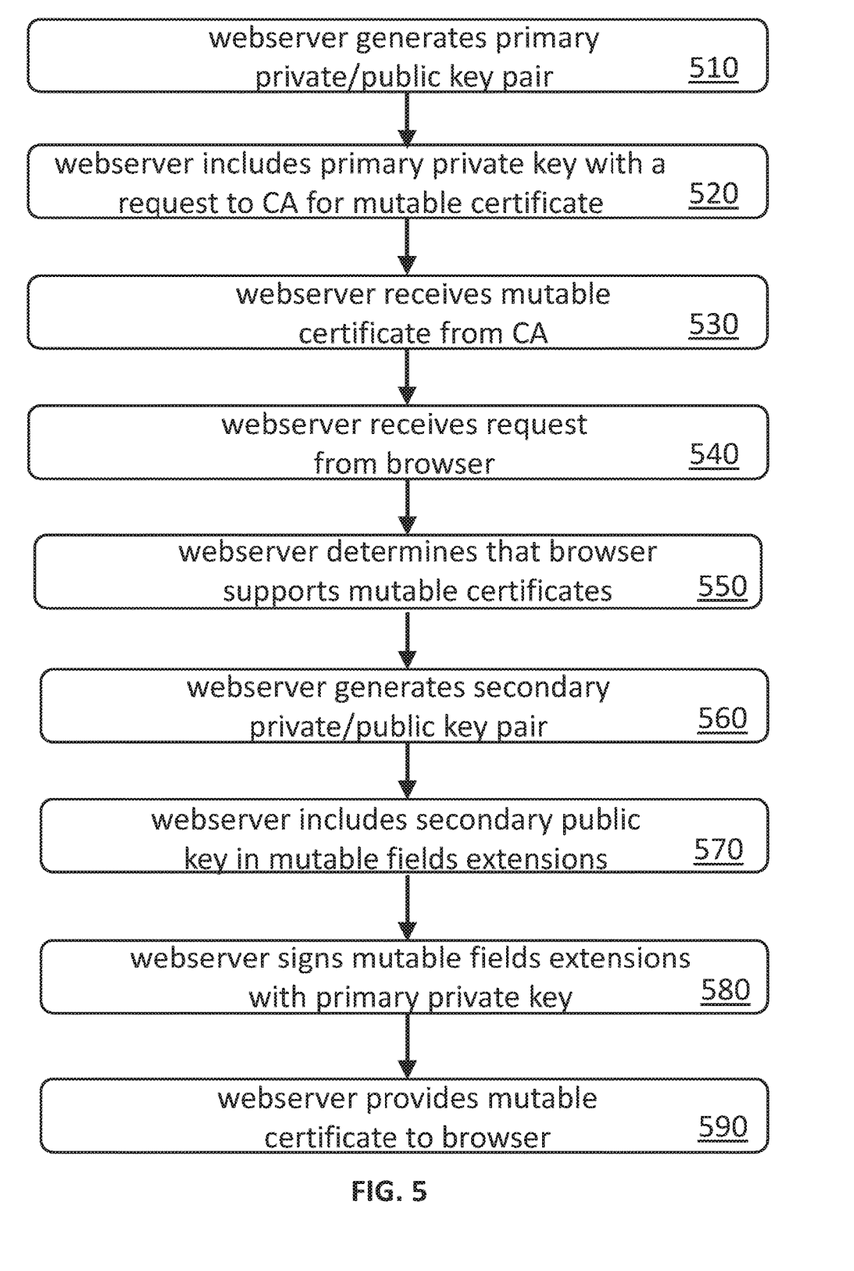
FIG. 5 is a flow chart illustrating an embodiment in which a webserver uses a secondary private/public key pair to increase security of a primary private key.

Another application of this invention allows a webserver to more strongly protect its private key associated with a certificate. FIG. 5 illustrates one exemplary method for this application. At step 510, webserver 330 generates a private private/public key pair. At step 520, webserver 330 includes the primary public key with a request to CA 340 for a mutable certificate. At step 530, webserver 330 receives the requested mutable certificate from CA 340. The received mutable certificate may include webserver 330's primary public key, and also identifies the public key, i.e., the "Subject Public Key Info:Modulus" field as a modifiable field in the Mutable Fields extension. The Mutable Fields extension will indicate the allowable values for modifications to the webserver's public key. The allowable value will often be any value, although the allowable values could be restricted otherwise.

At step 540, webserver 330 receives a request from browser 320 for a resource such as a webpage. At step 550, webserver 330 determines that requesting browser 320 supports mutable certificates.

At step 560, webserver 330 generates a secondary private/public key pair. Webserver 330 may alternatively retrieve a secondary public/private key pair from a predetermined service or resource, e.g., from a separate server that handles keys). At step 570, webserver includes the secondary public key in the mutable fields extensions, indicating that the party receiving the certificate, i.e., the browser, should set the subject primary key to the secondary public key as provided in the mutable field values extension.

At step 580, webserver 330 signs the Mutable Field Values extension, hashed using Certificate Signature Algorithm 160, with is primary private key.

At step 590, webserver 330 provides the mutable certificate to browser 320.

Using this approach, webserver 330 may generate a new secondary private/public key pair, and may include the new secondary public key as a modified field value in Mutable Field Values extension 140. With this approach, webserver 330's primary private key is used only once per session (of communication with a browser)—to sign the Mutable Field Values extension hash—and the remainder of the communication session uses webserver 330's secondary public key. Because the primary private key is now subject to only limited usage, it may be stored in a more secure location, e.g., on a separate server or computing device.

A person of ordinary skill will appreciate that may variations of the invention disclosed herein are within the scope of this invention. Variations may include, but are not limited to, the use of fields other than those specifically references in the examples disclosed herein, or different formats or schemes for storing, structuring, or encode an X.509 certificate, or the information in an X.509 certificate, or the user of certificate schemes or protocols other than X.509, or substation of different encryption or hashing algorithms or protocols.

What is claimed is:

1. A method for a certificate authority to facilitate field updates in a digital certificate, comprising:
    receiving a request for a digital certificate;
    preparing the digital certificate to include:
        one or more mutable fields, wherein the one or more mutable fields are authorized for modification after the digital certificate has been signed by a certificate authority, and
        a set of values in association with at least a given mutable field of the one or more mutable fields, wherein the set of values is authorized for insertion into the given mutable field after the digital certificate has been signed by the certificate authority;
    signing, with a private key of the certificate authority, the digital certificate; and
    providing the digital certificate in response to the request.

2. The method of claim 1, wherein the one or more mutable fields are empty at a time of said providing the digital certificate in response to the request.

3. The method of claim 1, wherein the one or more mutable fields comprise a field for a public key of a subject of the digital certificate.

4. The method of claim 1, wherein the digital certificate is an X.509 certificate.

5. The method of claim 1, wherein said signing the digital certificate comprises signing, with the private key of the certificate authority, the set of values that are authorized for insertion into the given mutable field after the digital certificate has been signed by the certificate authority.

6. A method for a holder of a digital certificate to modify one or more fields of the digital certificate, comprising:
    receiving a digital certificate from a certificate authority, wherein the digital certificate comprises:
        one or more mutable fields that are authorized for modification after the digital certificate has been signed by the certificate authority, and
        allowable values associated with at least one of the one or more mutable fields, wherein the allowable values comprise values that are authorized for insertion into the at least one of the one or more mutable fields after the digital certificate has been signed by the certificate authority;
    receiving a request for a resource;
    preparing the digital certificate, said preparing comprising:
        inserting one or more values into the one or more mutable fields; and
        signing, with a private key of the holder of the digital certificate, the one or more values inserted into the one or more mutable fields; and
    providing the digital certificate in response to the request for the resource.

7. The method of claim 6, wherein the one or more mutable fields are empty at a time of said receiving the digital certificate from the certificate authority.

8. The method of claim 6, where the one or more mutable fields comprise a field for a public key of the holder of the digital certificate.

9. The method of claim 8, wherein the one or more values inserted into the one or more mutable fields comprise the public key of the holder of the digital certificate.

10. The method of claim 6, wherein said signing the one or more values inserted into the one or more mutable fields comprises hashing the one or more values inserted into the one or more mutable fields and signing a resulting hash with the private key of the holder of the digital certificate.

11. The method of claim 6, wherein the request is a first request, and wherein the method further comprises:
    receiving a second request;
    inserting one or more modified values into the one or more mutable fields;
    signing, with the private key of the holder of the digital certificate, the one or more modified values inserted into the one or more mutable fields; and
    providing the digital certificate in response to the second request.

12. A method for a holder of a digital certificate to secure a primary private key, comprising:
    receiving the digital certificate from a certificate authority, wherein the digital certificate comprises:
        one or more mutable fields that are authorized for modification after the digital certificate has been signed by the certificate authority and wherein one of the one or more mutable fields comprises a subject public key field, and
        allowable values associated with at least one of the one or more mutable fields, wherein the allowable values comprise values that are authorized for insertion into the at least one of the one or more mutable fields after the digital certificate has been signed by the certificate authority;
    receiving a request for a resource;
    generating a secondary private/public key pair comprising a secondary private key and a secondary public key;
    inserting the secondary public key in the subject public key field;
    generating a signature by signing, with a primary private key, any values inserted into the one or more mutable fields including the secondary public key in the subject public key field; and
    providing the digital certificate together with the signature in response to the request for the resource.

13. The method of claim 12 further comprising:
    receiving a security token encrypted with the secondary public key; and
    using the secondary private key to decrypt the security token.

14. The method of claim 13, wherein the security token is a symmetric key.

15. The method of claim 12, further comprising storing the primary private key in a location that is more secure than a storage location for the secondary private key.

16. A method for a client to implement mutable fields, comprising: requesting a resource from a server;

receiving, in response to said requesting, a digital certificate issued by a certificate authority, the digital certificate including a public key of the server;
determining that the digital certificate implements one or more mutable fields through one or more certificate extensions, wherein the one or more mutable fields comprise certificate fields that are authorized for modification after the digital certificate has been signed by the certificate authority, wherein the digital certificate further includes allowable values associated with at least one of the one or more mutable fields, wherein the allowable values comprise values that are authorized for insertion into the at least one of the one or more mutable fields after the digital certificate has been signed by the certificate authority;
identifying values inserted into the one or more mutable fields; and
verifying, using the public key of the server, the values inserted into the one or more mutable fields.

17. The method of claim 16 further comprising:
obtaining a symmetric key;
signing the symmetric key with the public key of the server; and
transmitting the signed symmetric key to the server.

18. A computing device for facilitating updating of fields in a digital certificate, the computing device comprising at least a processor and a memory, wherein the memory stores instructions that, when executed on the processor, cause the computing device to perform a method comprising:
receiving a request for a digital certificate;
preparing the digital certificate to include:
one or more mutable fields, and
a set of values in association with at least a given mutable field of the one or more mutable fields, wherein the set of values is authorized for insertion into the given mutable field after the digital certificate has been signed by a certificate authority;
signing, with a private key of the certificate authority, the digital certificate; and providing the digital certificate in response to the request.

19. A computing device for modifying one or more fields of a digital certificate, the computing device comprising at least a processor and a memory, wherein the memory stores instructions that, when executed on the processor, cause the computing device to perform a method comprising:
receiving a digital certificate from a certificate authority, wherein the digital certificate comprises:
one or more mutable fields that are authorized for modification after the digital certificate has been signed by the certificate authority, and
allowable values associated with at least one of the one or more mutable fields, wherein the allowable values comprise values that are authorized for insertion into the at least one of the one or more mutable fields after the digital certificate has been signed by the certificate authority;
receiving a request for a resource;
preparing the digital certificate, said preparing comprising:
inserting one or more values into the one or more mutable fields, and
signing, with a private key of the holder of the digital certificate, the one or more values inserted into the one or more mutable fields; and
providing the digital certificate in response to the request for a resource.

20. A computing device for securing a primary private key, the computing device comprising at least a processor and a memory, wherein the memory stores instructions that, when executed on the processor, cause the computing device to perform a method comprising:
receiving a digital certificate from a certificate authority, wherein the digital certificate comprises:
one or more mutable fields that are authorized for modification after the digital certificate has been signed by the certificate authority, wherein one of the one or more mutable fields comprises a subject public key field, and
allowable values associated with at least one of the one or more mutable fields, wherein the allowable values comprise values that are authorized for insertion into the at least one of the one or more mutable fields after the digital certificate has been signed by the certificate authority;
receiving a request for a resource;
generating a secondary private/public key pair comprising a secondary private key and a secondary public key;
inserting the secondary public key in the subject public key field;
generating a signature by signing, with a primary private key, any values inserted into the one or more mutable fields including the secondary public key in the subject public key field; and
providing the digital certificate together with the signature in response to the request for the resource.

21. The computing device of claim 20, wherein the memory stores additional instructions that, when executed on the processor, cause the computing device to perform an additional method comprising:
receiving a security token encrypted with the secondary public key; and
using the secondary private key to decrypt the security token.

22. A computing device for implementing mutable fields, the computing device comprising at least a processor and a memory, wherein the memory stores instructions that, when executed on the processor, cause the computing device to perform a method comprising:
requesting a resource from a server;
receiving, in response to said requesting, a digital certificate issued by a certificate authority, the digital certificate including a public key of the server;
determining that the digital certificate implements one or more mutable fields through one or more certificate extensions, wherein the one or more mutable fields comprise certificate fields that are authorized for modification after the digital certificate has been signed by the certificate authority, and wherein the digital certificate further includes allowable values associated with at least one of the one or more mutable fields, wherein the allowable values comprise values that are authorized for insertion into the at least one of the one or more mutable fields after the digital certificate has been signed by the certificate authority;
identifying values inserted into the one or more mutable fields; and
verifying, using the public key of the server, the values inserted into the one or more mutable fields.

23. The computing device of claim 22, wherein the memory stores additional instructions that, when executed on the processor, cause the computing device to perform an additional method comprising:
preparing a security token;

signing the security token with the public key of the server; and transmitting the signed security token to the server.

\* \* \* \* \*